United States Patent [19]

Yasuda et al.

[11] Patent Number: 4,957,352

[45] Date of Patent: Sep. 18, 1990

[54] ELECTROCHROMIC DISPLAY DEVICE

[75] Inventors: Akio Yasuda, Tokyo; Kengo Ito, Kanagawa, both of Japan

[73] Assignee: Sony Corporation, Tokyo, Japan

[21] Appl. No.: 224,813

[22] Filed: Jul. 27, 1988

[30] Foreign Application Priority Data

Jul. 29, 1987 [JP] Japan ................. 62-189451

[51] Int. Cl.$^5$ ............... G02F 1/01; G09G 3/34
[52] U.S. Cl. ..................... 350/353; 350/357; 340/785; 340/786
[58] Field of Search ........... 350/353, 357; 340/785, 340/786

[56] References Cited

U.S. PATENT DOCUMENTS

| | | | |
|---|---|---|---|
| 3,010,883 | 11/1961 | Johnson et al. | 346/165 X |
| 4,033,673 | 7/1977 | Seki | 350/357 |
| 4,374,001 | 2/1983 | Bernier | 204/2 |
| 4,500,878 | 2/1985 | Hareng et al. | 340/785 X |
| 4,549,192 | 10/1985 | Hung | 204/2 |
| 4,728,177 | 3/1988 | Green | 350/357 |

Primary Examiner—Eugene R. LaRoche
Assistant Examiner—Michael B. Shingleton
Attorney, Agent, or Firm—Hill, Van Santen, Steadman & Simpson

[57] ABSTRACT

An electrochromic display is disclosed, in which an electrochromic material layer is disposed between a pair of plates each having an array of electrodes. The electrochromic material layer is composed of leuco dyes, supporting electrolyte and binder. The leuco dyes can be colored and discolored upon application of current thereto in a liquefied state of the material layer. Melting the material layer and application of current are carried out by the array of the electrodes.

6 Claims, 2 Drawing Sheets

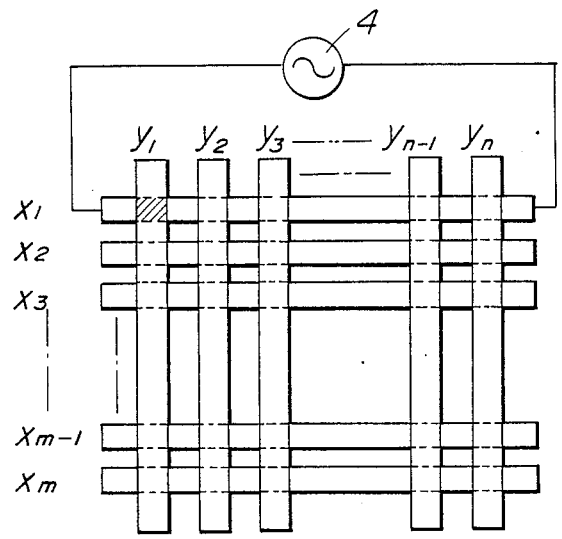
FIG. 3
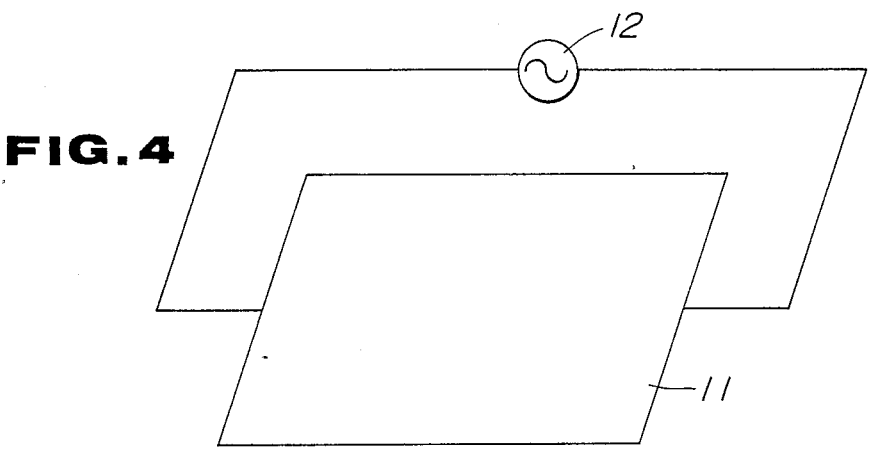
FIG. 4
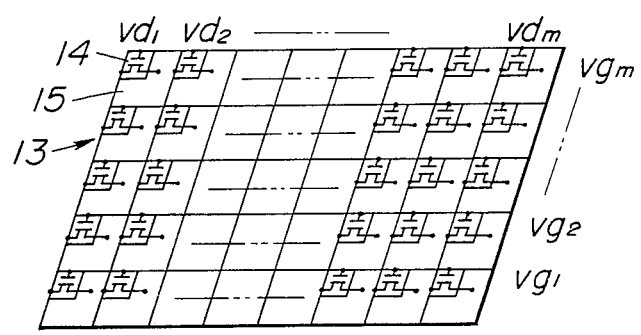

4,957,352

ELECTROCHROMIC DISPLAY DEVICE

BACKGROUND OF THE INVENTION

This invention relates to an electrochromic display device using a display material of which colored state reversibly changes by heat and electric field.

In the field of various displays, development of so called flat displays is being carried out. For one of such displays, an electrochromic display device (ECD) using an electrochromic material as display material is proposed.

This electrochromic display device is a device utilizing a reversible color change occuring in solid or liquid by the application of voltage, and will be expected as a high quality display device because it is excellent in that it is easy to see as compared to a liquid crystal using a polarizing plate or for any other reason.

While, such an electrochromic display device has the above-mentioned merit, at is the present state this device has great problems that most of such devices exhibit coloring and decoloring in monochrome, thus full color display is difficult, and when an attempt is made to drive it using a simple X-Y matrix, non-selected points are colored because of the current type device, resulting in lowering of resolution, and the like.

OBJECT AND SUMMARY OF THE INVENTION

It is an object of the present invention to provide a novel electrochromic display device.

It is another object of the present invention to provide an electrochromic display device improved in resolution by avoiding crosstalk upon driving the device utilizing X-Y matrix electrodes.

It is further object of the invention to provide an electrochromic display device which can display multicolor image or full color image.

According to one aspect of the invention there is provided an electrochromic display device which comprises a display material layer including a coloring matter and a supporting electrolyte to produce oxidation and/or reduction reaction by conducting a solid-liquid change by heating and cooling, and applying a current in a liquefied state, thereby to effect coloring and decoloring, a first electrode for heating said display material layer, and a second electrode for selectively applying a current to the display material layer of a portion liquefied by heating by means of said first electrode.

BRIEF DESCRIPTION OF THE DRAWINGS

FIG. 3 is a plan view showing, in a model form, an arrangement of heating electrode and current application electrode, and FIG. 4 is a schematic perspective view showing, in a model form, another example of heating electrode and current application electrode.

DESCRIPTION OF THE PREFERRED EMBODIMENTS

Figure 1:
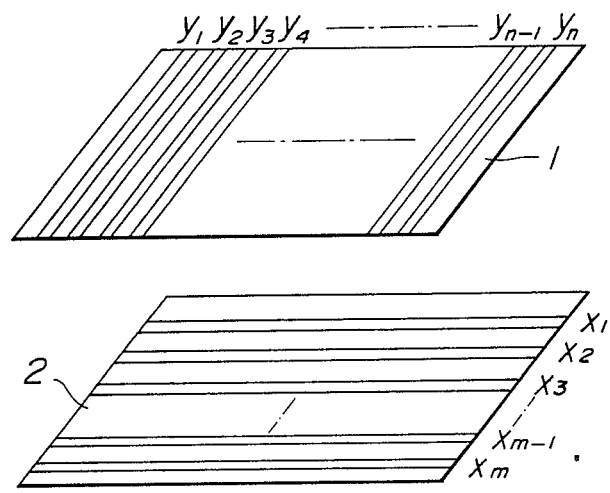
FIG. 1 is an exploded perspective view showing, in a model form, an example of an electrode arrangement of an electrochromic display device of the present invention.

As a result of the fact that the inventors of this invention have energetically conducted many studies or examinations in contemplation of attainment of the above objects, they have now obtained the knowledge that an electrode reaction which gives rise to oxidation-reduction of a coloring matter can be produced in a material layer exhibiting a solid-liquid change by heating and melting it, and that if the colored state is controlled by both heat and electric field, then there is no possibility that any crosstalk occurs even when a simple matrix drive is employed. In this connection, a U.S. patent application has already been filed based on a corresponding Japanese patent application No. 141714/87 filed June 6, 1987 assigned to the assignee of the present application.

An electrochromic display device of this invention has been completed on the basis of the above knowledge, and is characterized in that it comprises a display material layer including a coloring matter and a supporting electrolyte to produce oxidation and/or reduction reaction by conducting a solid-liquid change by heating and cooling, and by applying a current in a liquefied state, thereby to effect coloring and decoloring, a first electrode for heating the display material layer, and a second electrode for selectively applying a current to the display material of a portion liquefied by heating by means of the first electrode.

For the coloring matter included in the material layer, any colors may be used only if they are colored, decolored, or discolored by an electric oxidation-reduction reaction.

For such a coloring matter, a leuco dye having a lactone ring, e.g., triphenylmethane phthalides or fluorans, thiofluorans, indoleyl phthalides, rhodamine lactums, azaphthalides, and the like are mentioned and the following compounds are examplified.

First, for triphenylmethane phthalides, crystal violet lactone, and malachite green lactone, etc. are mentioned. For fluoran family, 3-diethylamino-6-methyl-7-chlorofluoran, 3-diethylamino-7-methoxyfluoran, 3-diethylamino-6-benzyl oxyfluoran, 1,2-benzu-6-diethylamino fluoran, 3,6-di-ptoluidino-4,5-dimethyl fluoran-phenylhidorazido-γ-lactum, 3-amino-5-methylfluoran, 2-methyl-3-amino-6-methyl-7-methyl fluoran, 2,3-butylene-6-di-n-butylamino fluoran, 3-diethyl amino-7-anilinofluoran, 3-diethylamino-7-(paratoluidino)fluoran, 7-acetoamino-3-diethylamino fluoran, 2-bromo-6cyclohexylamino fluoran, and 2,7-dichloro-3-methyl-6-n-butyl amino fluoran, etc. are mentioned.

For thiofluorans, 3-diethylamino-6-methyl-7-dimethyl amino-tiofluoran, and 3-diethylamino-7-dibenzylaminotiofluoran, etc. are mentioned. For indoleyl phthalide family, 8-(4-diethylamino phenyl)-8-(1-ethyl-2-methylindole-8-yl)phthalide, 3,3-bis(1-etyl-2-methyl-8-yl)phthalide, 3,3-bis(2-phenylindole-3-yl)phthalide, 3-(4-di-n-butylamino phenyl)-3-(2-phenylindole-3-yl)phthalide, and 8-4-(dimethyl amino)phenyl-3-N,N-bis-(4-octylphenyl)amino phthalide, etc. are mentioned.

Further, for rhodamine lactums, rhodamine lactone, etc. is mentioned, and for azaphthalides, 3-3-bis(1-etyl-2-methylindole-3-yl)-7-azaphthalide, etc. is mentioned.

In addition, leuco basic cianine, leuco malachite green, leuco crystal violet, p,p'-tetradimethylamino benzophenone (Michler's ketone), oxazine leuco heat sensitive coloring compound (manufactured by Hodogaya Kagaku company, trade name CSB-12, etc.), spiropyran leuco heat sensitive coloring compound (manufactured by Hodogaya Kagaku company, trade name CSR-13, etc.), and quinoline leuco heat sensitive coloring compound (manufactured by Hodogaya Kagaku company, trade name CSY-13, etc.), and the like may be used.

It is preferable that coloring compounds used are leuco dyes having a lactone ring, e.g., fluoran compound, or phthalide compound, etc. among them. If leuco dye having a lactone ring is used, a reversible oxidation-reduction reaction excellently takes place. Thus, coloring and decoloring are reversibly repeated.

It is to be noted that these coloring compounds may be used individually, or mixture of two or more kinds thereof may be used to control color tone, etc.

The adding concentrations of each coloring compound mentioned above may be suitably set depending upon a required coloring density. It is to be noted that since it is required that the coloring compound be completely dissolved into the material layer, the upper limit of the concentration necessarily becomes equal to the solubility limit into insulating medium, or the supporting electrolyte which will be described later. Although there is particularly no restriction in regard to the lower limit, it is preferable that a coloring compound of more than $1/10^7$ in terms of weight ratio is included in the material layer in consideration of a contrast ratio at the time of coloring and decoloring.

On the other hand, supporting electrolyte is added in order to ensure conductivity when the material layer is melted to promote oxidation-reduction reaction of the coloring compound. For such supporting electrolyte, aliphatic quaternary ammonium salt, e.g., tetrafluoro boric acid tetra-n-butylammonium, perchloric acid tetra-n-butylammonium, cetyl trimethyl ammonium bromide, and dioctadecile dimethyl ammonium cholride, etc., benzalkonium salt, e.g., myristyl dimethylbenzyl ammonium chloride, etc., benzethonium chloride family, e.g., benzyl dimethyl [2-]2-(p-1,1,2,3tetramethylbutyl phenoxy) ethoxy]etyl-] ammonium chloride, etc., alkylpyridium salt, and imidazolinium salt, etc. may be used.

In addition, ionic surface active agent, e.g., anionic surface active agent, etc. may be used for the supporting electrolyte. For an anionic surface active agent, carboxylic acid salts represented by fatty acid soap, sodium palmitate, potassium stearate, and alkylether carbonic acid, etc., sulfonates represented by alkylbenzene sulfonate, e.g., laurylbenzen sodium sulfonate, alkylnaphthalene sulfonate, e.g., naphthalene sodium sulfonate, etc., naphthalene soddium sulfonate formalin condensate, and dialcoxysulfonic succinate, sulfates represented by alkylsulfate, alkylether sulfate, polyoxyethylene alkylether sulfate, and alkylphenylether sulfate, etc., and phosphates, represented by alkylphoshate, and alkyleter phosphate, etc. are examplified.

It is to be noted that when such ionic surface active agents are used as the supporting electrolyte, it is preferable to use the above-mentioned ammonium salt as the supporting electrolyte because there is concern of thermal coloring due to acide material, or the like.

For concentration of the supporting electrolyte, in the case of using the supporting electrolyte with it being dissolved in an insulating medium which effects solid-liquid change as described later, it is required to be completely dissolved into an insulating medium used, so that the upper limit of the concentration naturally becomes equal to the solubility, limimt. The lower limit thereof is equal to a minimum concentration which gives conductivity sufficient to effect oxidation-reduction of coloring matter using an electrode. Accordingly, it is preferable that the concentration range of the supporting electrolyte in the material layer be $10^{-10}$ mol/l to solubility the limit, although it depends upon the kind of insulating medium. More preferably, it is $10^{-3}$ to $10^{-1}$ mol/l. It is to be noted that when the supporting electrolyte itself exhibits solid-liquid change, the insulating medium is not used, and the above-mentioned concentration does not apply. In this case, it is sufficient to set only the concentration of the coloring matter subjected to dissolution into the supporting electrolyte so that it falls within a predetermined range.

The above-mentioned coloring compounds and supporting electrolytes are subjected to dissolution into the insulating medium, whereby they are used as a material layer. For an insulating medium used, it is required to dissolve the coloring compounds or supporting electrolytes, and to effect solid-liquid change by heating or cooling.

Any insulating medium which satisfies such requirements may be used. For example, polyethylene, polyacrylate, polymethacrylate, and polyacrylamide, etc. are mentioned, and homopolymers or copolymers thereof may be used. Especially, a high polymer having a long side chain is suitable. These polymers can be synthesized by polymerizing higher fatty acid ester of acrylic acid or methacrylic acid by itself or in the presence of other monomer in the form of a direct chain for example, by the technique such as radical polymerization or radical copolymerization, thus to obtain high molecular weight. Alternatively, liquid crystalline high molecular material, e.g., cyanobiphenyl polymer, copolymer of cyanophenyl benzoate and methoxybiphenyl benzoate, phenyl benzoate azomethyn polymer, and azomethyn polymer, etc. may be used.

Particularly, if a polymer having one or more carbonyl group ($C=O$) represented by ester or ketone, etc, in a molecular skelton is used, this is suitable in that a mechanism to assist reversible reduction of leuco dye in a thermal reactive manner is provided.

In addition, this insulating medium is required to dissolve the above-mentioned electrlyte in a solid state or at least in a liquid state of the insulating medium, otherwise electrochromic characteristics can not be exhibited. As a standard for dissolution capability of the insulating medium, the relative dielectric constant of the insulating medium is mentioned. It is preferable to use material having specific dielectric constant above 10 when solubility of, e.g., quaternary ammonium salt (supporting electrolyte) is taken into consideration.

It is to be noted that where the above-mentioned supporting electrolyte itself exhibits solid-liquid change, it is not required to necessarily use this insulating medium, and coloring compound may be dissolved into supporting electrolyte to form a material layer.

In the electrochromic display device of this invention, by applying a current thereto when the material layer comprising the above-mentioned coloring compound, supporting electrolyte and insulating medium, etc. is placed in a liquid state, oxidation-reduction reaction of the coloring compound occurs, thus utilizing the fact that it is colored or decolored. Accordingly, a combination of the heating electrode and the current application electrode can form pictorial images or printed letters in the material layer.

Various combinations of the heating electrode and the current application electrode may be employed.

For instance, it is sufficient to provide an electrode for heating the entire surface of the material layer and an electrode for selectively applying a current to the material layer. For the electrode for heating the entire surface of the material layer, an entire surface electrode may be formed on one side of the material layer to apply an a.c. bias thereto. On the other hand, for the electrode for selectively applying a current to the material layer, for example, drive elements such as TFTs (Thin Film Transistors) may be provided in correspondence with pixels. In this case, by allowing the material layer to be thermally melted or fused by means of the entire surface electrode to deliver a predetermined electric signal to the selective current application electrodes, images, or printed letters, etc. are displayed in accordance with this electric signal.

Alternatively, heating electrodes to which an a.c. bias is applied and current application electrodes for applying a direct current with the heating electrode being an opposite electrode may be disposed on both surfaces of the material layer so that they define a simple X-Y matrix, respectively. In this case, the material layer is colored or decolored only at the intersecting points of the heating electrodes and the current application electrodes.

In the electrochromic display device of this invention, the material layer including coloring compound and supporting electrolyte to effect solid-liquid change by heating or cooling exhibits coloring and decoloring behavior by an oxidation-reduction reaction only when both heating by the first electrode and application of current by the second electrode are conducted.

Accordingly, by controlling these first and second electrodes, pictorial images or printed letters are displayed.

Specific embodiments of this invention will be described with reference to the drawings.

EXAMPLE 1

This embodiment is an example of an electrochromic display device in which a simple matrix drive is employed.

Figure 2:
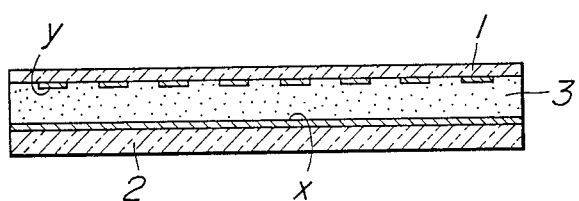
FIG. 2 is a schematic cross sectional view showing an example of an electrochromic display device of the present invention.

The display device of this embodiment is constituted, as shown in FIGS. 1 and 2, by holding a display material layer (3) between glass base plates (1) and (2) on opposite surfaces of which groups of transparent electrodes x and y are formed.

The groups of transparent electrodes x and y on the surface of the glass base plates (1) and (2) are formed of transparent conductive material, e.g., ITO (Indium Tin Oxide), etc. in parallel with each other. In this embodiment, transparent electrodes $y_1, y_2, y_3 \ldots y_{n-1}, y_n$ having a width of 3 mm of ITO, and similar transparent electrodes $x_1, x_2, x_3, \ldots, x_{m-1}, x_m$ are formed on one glass base plate (1) and the other glass plate (2), respectively. It is to be noted that the electrode material is not limited to the above, but $SnO_2$, etc. may be used, and that either of electrodes (particularly opposite to the display surface) is not transparent according to circumstances.

The glass base plate (1) and the glass base plate (2) are arranged and combined so that the group of transparent electrodes y and the group of transparent electrodes x are perpendicular to each other. To the group of transparent electrodes x, an a.c. bias power source is connected for permitting a.c. biases to be individually applied, respectively. Between the group of transparent electrodes y and the group of transparent electrodes x, a d.c. power source is connected for permitting application of a direct current.

On the other hand, the display material (3) is prepared by dispersing coloring matter and supporting electrolyte, etc. into the insulating medium. In this embodiment, the composition is as follows.

Composition p-dodecyl oxycyano biphenyl
(Solid-liquid change insulating medium) . . . 50 parts by weight Dioctadecyl dimethyl ammonium chloride
(Supporting electrolyte) . . . 50 parts by weight 2-(2'-chlorophenylamino)-6-di-n-butylamino fluoran (leuco dye) manufactured by Hodogaya Kagaku company, trade name TH107 . . . 10 parts by weight The structural formula of the leuco coloring matter used is shown by the following equation (1)

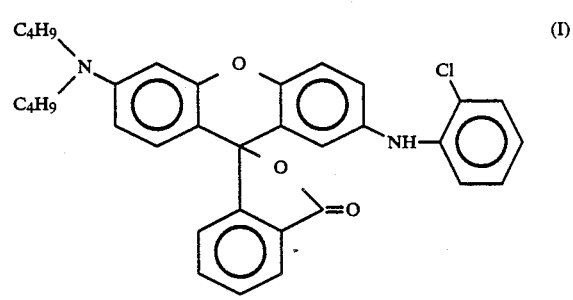

In this embodiment, the display material having the above-mentioned composition is heated, thus placing it in a melted state. After it is coated onto one glass base plate (2), the other glass base plate (1) is placed thereon and is press-bonded thereto before the display material coated has solidified to leave it at a room temperature, thus to manufacture a display device of the structure shown in FIG. 2.

The arrangement of the electrodes of the display device thus manufactured is shown in FIG. 3. In the display device of this embodiment, simple the X-Y matrix is constituted by the group of transparent electrodes x and the group of transparent electrodes y. It is to be noted that the group of transparent electrodes x are formed in a longitudinal direction in the figure in this embodiment, but the group of transparent electrodes x may be formed in a lateral direction in the figure and the group of transparent electrodes y may be formed in a longitudinal direction in the figure.

An attempt has been made to effect coloring and decoloring of the display material layer (3) by using the group of transparent electrodes x and the group of transparent electrodes y.

First, a.c. bias power supply (4) is connected to both ends of the transparent electrode $x_1$ formed on the glass base plate (1) to apply an a.c. bias of 10 V and 50 Hz thereto. In this instance, the transparent electrode $x_1$ is 3 mm thick and has an impedance of 60 $\Omega$/cm. As a result, the transparent electrode $x_1$ which serves as a resistor generates Joule heat. Thus, the temperature of the electrode itself rises and only the display material layer (3) on the transparent electrode $x_1$ was melted or fused in ten seconds.

Then, a selection of the transparent electrode $x_1$ and the transparent electrode $y_1$ was made to apply a d.c. voltage of 6.0 V thereacross so that the transparent electrodes $x_1$ and $y_1$ become minus and plus, respectively.

Thus, only at the portion where the display material layer (3) was melted or fused by heat, viz., only at the portion (indicated by the slanted line region in FIG. 3)

where the transparent electrodes $x_1$ and $y_1$ intersect with each other, the leuco dye was oxidized by an electrochemical oxidation-reaction and was colored dark green from a colorless state on the transparent electrode $y_1$.

In this case, when the display material layer (3) is in a solid state, no electrode reaction takes place with such an order of voltage. Accodingly, the display material layer (3) is not colored on the transparent electrode $y_1$ or on the transparent electrode $x_1$ except for the slanting line region.

Since the display material layer (3) is cooled and solidified by cutting off the a.c. bias applied to the transparent electrode $x_1$ in the coloring condition, the coloring of the display material layer (3) is maintained.

Erasing may be accomplished by applying an a.c. bias to the transparent electrode x, for a second time to apply a d.c. voltage thereto with the polarity being changed so that the transparent electrode $x_1$ is plus and the transparent electrode $y_1$ is minus.

Accordingly, in this embodiment, by selecting an electrode for applying an a.c. bias and an electrode for applying a d.c. voltage, an arbitrary point of the display material layer (3) can be colored. Thus, a simple X-Y matrix completely free from crosstalk is realized.

EXAMPLE 2

This embodiment is an example where an entire surfce heating electrode and selective current application electrodes corresponding to pixels are combined.

In this embodiment, the heating electrode is constructed as an entire surface electrode (11) covering the entire surface of the display material layer, and an a.c. bias power supply (12) is connected to both ends thereof. Accordingly, by applying an a.c. bias to the entire surface electrode (11) by using the a.c. bias power supply (12), the entirety of the display material layer is heated and melted or fused as shown in FIG. 4.

On the other hand, a current application electrode matrix (13) is composed of a group of thin film transistors (14) corresponding to respective pixels, pixel electrodes (15) connected to the sources of those thin film transistors (14), gate electrodes $V_{g1}$, $V_{g2}$, ... $V_{gn}$ to which the gates of respective thin film transistors are connected, and drive electrodes $V_{d1}$, $V_{d2}$ ... $V_{dn}$ connected to the drains of respective thin film transistors (14).

In the display device in which the display material layer is held between these electrodes (11) and (13), by applying an a.c. bias to the entire surface electrode (11) to allow the entirety of the display material layer to be melted or fused, thereafter to selectively drive the gate electrodes and the drive electrodes, a voltage is applied to a predetermined pixel electrode (15). Thus, the display material layer of that portion is colored.

As is clear from the foregoing description, since coloring and decoloring state of the display material is controlled by both heat and electric field in the display device of this invention, it is possible to provide an electrochromic display device in which there is no crosstalk even when a simple matrix is employed, and large area display or high resolution display can be conducted.

In addition, in the display device of this invention, by selecting a coloring matter having a predetermined coloring from a large number of oxidation-reduction coloring matters, coloring and decoloring having a plurality of colors, e.g., RGB (three primary colors of the additive color process), YMC (three primary colors of the subtractive color process), etc. can be effected. Thus, full color display can be also conducted.

What is claimed:

1. An electrochromic display comprising an electrochromic material layer provided between a pair of plates, at least one of said plates being transparent, said electrochromic material layer composed of a coloring compound and a supporting electrolyte means for heating said electrochromic material layer to liquefy said electrochromic material layer to convert the layer into electrical conduction and means for applying a current to said material layer to cause oxidation and/or reduction reaction of said coloring compound when the electrochromatic layer is in a liquified condition.

2. An electrochromic display according to claim 1, said means for heating said electrochromic material layer is an electrode applied with a.c. current.

3. An electrochromic display according to claim 1, said means for applying a current is an array of electrodes which contact said electrochromic material.

4. An electrochromic display according to claim 1, said coloring compound is selected from at least one of leuco dyes, triphenylemethane phthalides, fluorans, thiofluorans, indoleyl phthalides, rhodamine lactums, azaphthalides.

5. An electrochromic display according to claim 1, said coloring compound is leuco dye which has a lactone ring therein.

6. An electrochromic display according to claim 1, said means for applying a current is an array of switching transistors.

* * * * *